United States Patent [19]

Davis et al.

[11] E Patent Number: Re. 33,244

[45] Reissued Date of Patent: Jun. 26, 1990

[54] COMPUTERIZED VIDEO IMAGING SYSTEM

[76] Inventors: Robert C. Davis, 8105 Hauser, Lenexa, Kans. 66215; Steven E. Curd, 5739 E. 64th St., Tulsa, Okla. 74136; Gregory L. Breedlove, 708 N. Curtis, Olathe, Kans. 66061; Alan H. Colen, 8929 Westbrook Dr., Overland Park, Kans. 66212; Louis P. Armstrong, 4717 Yecker, Kansas City, Kans. 66104

[21] Appl. No.: 179,760

[22] Filed: Apr. 11, 1988

Related U.S. Patent Documents

Reissue of:

[64] Patent No.: 4,583,186
Issued: Apr. 15, 1986
Appl. No.: 593,422
Filed: Mar. 26, 1984

[51] Int. Cl.[5] ..... G03F 3/00; H04N 9/535; G06F 15/20

[52] U.S. Cl. ..... 364/526; 358/76; 358/77; 358/80; 358/183; 364/518

[58] Field of Search ..... 364/525, 526, 522, 518; 358/75, 76, 80, 55, 180, 183; 355/18, 37, 38, 77, 69

[56] References Cited

U.S. PATENT DOCUMENTS

| | | | |
|---|---|---|---|
| 2,784,246 | 3/1937 | Hurford | 358/183 |
| 2,886,636 | 5/1959 | Grace | 358/183 |
| 3,011,388 | 12/1961 | Baumbach et al. | 358/80 |
| 3,322,025 | 5/1967 | Dauser | 358/80 |
| 3,552,288 | 1/1971 | Corley | 358/80 |
| 3,643,294 | 2/1972 | Wilson | 178/5.4 |
| 3,702,733 | 11/1972 | Sokolow | 358/80 |
| 3,722,465 | 11/1973 | Vlahos et al. | 355/404 |
| 3,754,824 | 8/1973 | Weisglass et al. | 355/35 |
| 3,818,216 | 6/1974 | Larraburu | 240/41.3 |
| 4,037,249 | 7/1977 | Pugsley | 358/76 |
| 4,050,808 | 9/1977 | Gyori et al. | 355/38 |
| 4,068,943 | 1/1978 | Gyori | 355/38 |
| 4,097,892 | 6/1978 | Balding | 358/80 |
| 4,121,283 | 10/1978 | Walker | 364/200 |
| 4,124,292 | 11/1978 | Van Wandelen | 355/37 |
| 4,140,391 | 2/1979 | Laciak et al. | 364/525 |
| 4,183,046 | 1/1980 | Dalke et al. | 358/22 |
| 4,200,867 | 4/1980 | Hill | 340/703 |

(List continued on next page.)

FOREIGN PATENT DOCUMENTS 1556812 11/1979 United Kingdom ..... 358/183

OTHER PUBLICATIONS

Hopkins; "Centering Images in Split-Screen TV Displays"; NASA Technical Briefs; Fall/1979.

Ullrich et al.; "TV Receiver Puts Two Pictures on Screen at Same Time"; Electronics, 8/1/1977.

Simmons; "Window and Scissor For Display Data"; IBM Technical Disclosure; Oct. 1978.

Leonard; "Considerations Regarding The Use of Digital Data to Generate Video Backgrounds"; SMPTE, 8/1978.

*Primary Examiner*—Felix D. Gruber
*Assistant Examiner*—Ellis B. Ramirez
*Attorney, Agent, or Firm*—Litman, McMahon & Brown

[57] ABSTRACT

A computerized video imaging system is provided which includes a target mount for supporting a target photographic transparency. A lamphouse is positioned to pass light through the transparency and includes light sources for a set of primary colors. An image sensor is positioned to receive light passing from the lamphouse through the transparency and generates video signals representing hue and intensity of the light. Image storage means are provided for storing color reference representations of the reference transparency. A color video monitor receives signals related to the reference representations and the target video signals. A computer interfaces with the light source and the image storage to calculate photographic color correction values for the target transparency.

55 Claims, 4 Drawing Sheets

U.S. PATENT DOCUMENTS

| | | | |
|---|---|---|---|
| 4,214,171 | 7/1980 | Gyori | 307/39 |
| 4,217,648 | 8/1980 | Thuron et al. | 364/526 |
| 4,257,066 | 3/1981 | Kaneko et al. | 358/183 |
| 4,258,385 | 3/1981 | Greenberg et al. | 358/22 |
| 4,285,580 | 8/1981 | Murr | 358/80 |
| 4,297,724 | 10/1981 | Masuda et al. | 358/183 |
| 4,303,986 | 12/1981 | Lans | 364/900 |
| 4,307,962 | 12/1981 | Jung | 356/405 |
| 4,318,121 | 3/1982 | Taite et al. | 358/22 |
| 4,329,710 | 5/1982 | Taylor | 358/81 |
| 4,334,245 | 6/1982 | Michael | 358/183 |
| 4,349,279 | 9/1982 | Jung | 356/402 |
| 4,393,398 | 7/1983 | Horiguchi et al. | 358/76 |
| 4,393,399 | 7/1983 | Gast et al. | 358/80 |
| 4,396,940 | 8/1983 | Tanaka et al. | 358/80 |
| 4,399,462 | 8/1983 | Balopole et al. | 358/183 |
| 4,418,390 | 11/1983 | Smith et al. | 364/526 |
| 4,425,581 | 1/1984 | Schweppe et al. | 358/183 |
| 4,477,179 | 10/1984 | Inuzuka et al. | 355/69 |
| 4,505,589 | 3/1985 | Ott et al. | 364/526 |
| 4,536,848 | 8/1985 | d'Entremont et al. | 364/525 |
| 4,613,906 | 9/1986 | Tanaka et al. | 358/183 |
| 4,641,255 | 2/1987 | Hohmann | 358/183 |
| 4,714,856 | 12/1987 | Takinaka et al. | 313/2.1 |

COMPUTERIZED VIDEO IMAGING SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention.

The present invention relates to video imaging, in particular, to a computerized video imaging system for analyzing and displaying photographic transparencies for deriving printing illumination values.

2. Description of the Prior Art.

In the field of photographic printing, realistic and aesthetically pleasing photographic prints are produced from transparencies by carefully controlling the variable aspects of the printing process, including the printing illumination. In color printing, the printing illumination can be adjusted to compensate for various deficiencies and excesses in the original transparency. Color-controllable lamphouses are well known and are generally of either the subtractive type wherein filters are employed to block extensive amounts of light of the subtractive primary colors magenta, yellow, and cyan and the additive type wherein separate light sources are provided for the additive primary colors red, green and blue. An example of an additive lamphouse is disclosed in the Van Wandelen U.S. Pat. No. 4,124,292 wherein white output bulbs are provided with filters for producing the desired colors and controlled to provide the desired mix. Analog controls for lamphouses such as potentiometers and the like are known, but such controls require calibration and results tend to vary between different control systems.

Printing illumination systems have also been devised which analyze a transparency and adjust the printing illumination accordingly to produce color prints which fall within certain predetermined "population centers" within which certain types of prints are classified. Such techniques are particularly well adapted for volume color printing operations since they tend to be highly automated and require little, if any, operator input. However, for high quality color photography such as portrait work and the like, trained operators are generally employed for manually adjusting the printing illumination until lifelike and attractive color balances are achieved. A positive image of the transparency may be projected on a color CRT monitor, for example as shown in the Horiguchi et al. U.S. Pat. No. 4,393,398. The operator then adjusts the illumination hue and density levels and observes the effects of such adjustments on the monitor. The operator will often compare the monitor image of the transparency with an existing reference image. Such reference images are generally in printed form and a problem exists in comparing CRT transparency images with photographic printed images. Because of the differences in the two display mediums and the inherent color distortions in the scanning and monitoring system, realistic and aesthetically pleasing photographic prints have been difficult, time consuming and expensive to achieve with prior art printing and analyzing systems.

Heretofore, there has not been available an imaging system which displays a reference image alongside a transparency image on a CRT monitor with the advantages and features of the present invention.

SUMMARY OF THE INVENTION

In the practice of the present invention, a system for analyzing and displaying a photographic transparency includes a control computer and an image control unit for video processing of electrical signals representative of an image on the transparency. A color controllable lamphouse is provided for illuminating the transparency. A reference image of known color balance is first analyzed by digitizing video signals representative thereof under controlled illumination from the lamphouse. A digitized representation of the reference image is stored in an image memory, the digital representations being altered according to look-up tables and then reconverted to analog signals and displayed on one half of the screen of a color video monitor. The production transparency is then illuminated by the lamphouse; and video signals representative of the image are digitized [;] , altered by the same look-up tables, and displayed on the other half of the monitor screen. The operator adjusts density and color controls to cause the computer to alter the balance of the lamphouse bulbs until the color balance of the production image visually matches the balance of the reference image. The operator presses an accept key, and the computer calculates color correction values representing the differences in the lamphouse color intensity settings for the adjusted color balance of the production transparency relative to the lamphouse setting for the reference transparency. The color correction values are printed or stored for use in printing a photograph from the production transparency.

OBJECTS OF THE INVENTION

The principal objects of the present invention are: to provide a computerized video imaging system; to provide such a system which is adapted for analyzing photographic transparencies; to provide such a system which is adapted for analyzing positive or negative transparencies; to provide such a system which includes a color-controllable lamphouse for illuminating the transparency; to provide such a system which may automatically adjust the illumination hue and density levels of the lamphouse in response to the subject matter of the transparency; to provide such a system which includes an image sensor for generating signals representative of an image from the transparency; to provide such a system which includes a digital image control unit for video processing of image information; to provide such a system which includes a zoom control associated with the image sensor for selective adjustment of the displayed size of a transparency and for allowing it to process images from transparencies of different sizes; to provide such a system which includes a focus control for the image sensor; to provide such a system which includes a color video monitor for displaying an image from the transparency; to provide such a system wherein the monitor is adapted for displaying an image of the transparency alongside a reference image; to provide such a system which may store and recall a plurality of reference images for various types of photographic subject matter; to provide such a system wherein an operator adjusts the displayed color balance of a transparency image by means of a vector length color control comprising a trackball associated with a color wheel; to provide such a system wherein the digital hardware and software are adapted for substantially self-calibration and diagnostic self-analysis to minimize maintenance requirements; to provide such a system wherein non-linearities of components within the system are compensated for by dynamic look-up tables which may be updated as components change because of age and which may be selectively called for negative or positive type transparencies; to provide such a system which is relatively drift free for long term consistency of accuracy; to provide such a system which does not impose its hardware limitations on the operator such that use of the system seems natural and acclimation of the operator is quick; to provide such a system which is compatible with a variety of peripheral devices for storing and processing information relating to the transparency and prints to be made therefrom; to provide such a system which is economical to manufacture, accurate and efficient in operation and which is particularly well adapted for the proposed usage thereof.

DESCRIPTION OF THE PREFERRED EMBODIMENT

Figure 1:
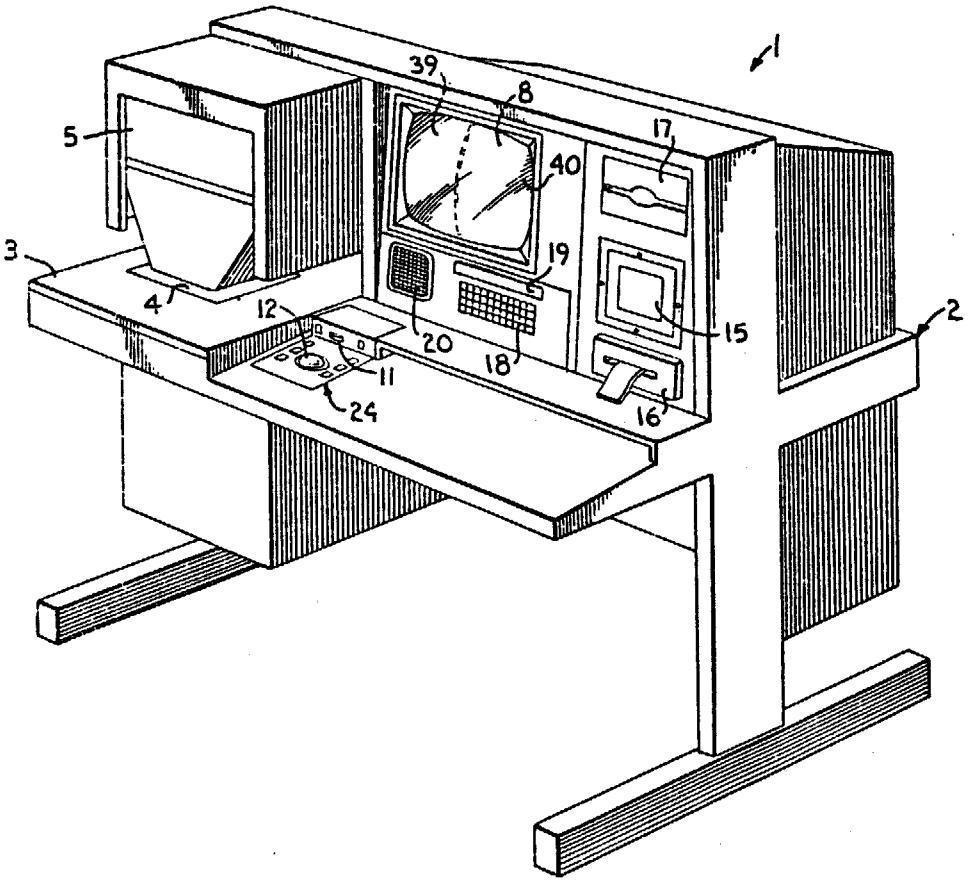
FIG. 1 is a perspective view of a workstation console housing the components of the computerized video imaging system according to the present invention.
Figure 3:
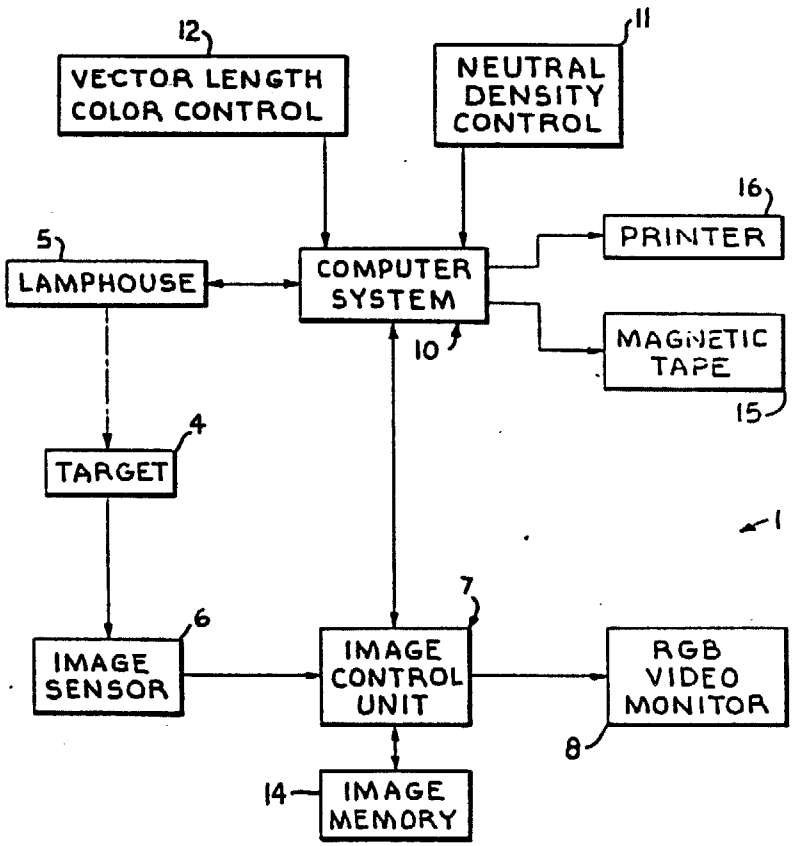
FIG. 3 is a simplified block diagram of the computerized video imaging system.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a computerized video imaging system. The system 1 generally includes a console 2 providing an object plane 3 to support a target 4, namely a negative or positive photographic transparency; a color controllable lamphouse 5 for illuminating an image sensor 6 through the target 4; an image control unit 7 for video processing of electrical signals representative of an image of the target 4; and a color video monitor 8 for displaying a reproduced image of the target 4 as illuminated by the lamphouse 5. The overall intensity of the light from the lamphouse 5 is controlled through a computer system 10 by adjustment of a neutral density control 11, and the color of light emanating from the lamphouse 5 is controlled by a color control 12.

In general, the system 1 is employed for the color analysis of photographic transparencies 4 to determine the color correction necessary in the printing of a properly color balanced photographic print therefrom. A digitized representation of a reference transparency is stored in an image memory 14 and is displayed on one half of the screen of the monitor 8 along with an image of the transparency to be analyzed on the other half. The density control 11 and color control 12 are adjusted such that the color balance of the image of the test transparency 4 visually matches the color balance of the reference image. When such a match has been achieved, the computer system 10 is controlled to convert the adjustments made in the controls 11 and 12 into standardized color correction values for recording on a magnetic tape 15 or for hard copy recording by a printer 16. The color correction values are subsequently employed during the production of a photographic print of the target transparency 4.

Referring to FIG. 1, the console 2 is preferably a self-contained work station housing the entire components of the system 1 for convenient use by an operator. The density and color controls 11 and 12 are placed at a standard table height as is the object plane 3. The video monitor 8 is at eye level for a sitting operator. The tape drive 15 and paper tape printer 16 are provided on the display panel of the console 2. A floppy disc drive 17 is provided for the storage of reference images and for the storage of software and the like associated with the computer system 10. A keyboard or switch panel 18 functions as a master control panel for operation of the system 1. Such things as start-up and shut-down of the system 1, diagnostics, and other functions related to the system as a whole are controlled by operation of keys on the keyboard 18. A digital read-out 19 is associated with the keyboard 18. An audio speaker 20 may be provided for audibly signalling the operator.

The lamphouse 5 includes sources (not shown) of red, green and blue (RGB) light which are controllable in intensity either simultaneously by operation of the density control 11 or as to balance of individual color intensities by the color or hue and intensity control 12. A lamphouse which is particularly suitable for the system 1 is disclosed in U.S. Pat. No. 4,124,292 which is incorporated herein by reference. As will be detailed more below, the lamphouse 5 includes a closed loop lamphouse control system 23 for sensing and maintaining the set color balance.

Figure 2:
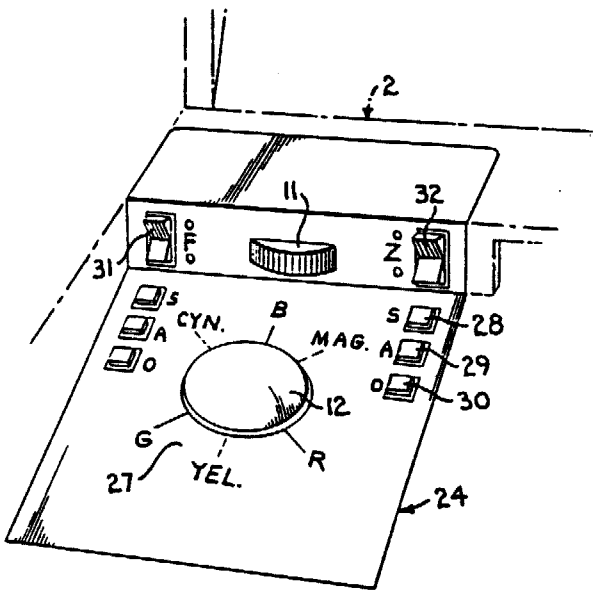
FIG. 2 is an enlarged perspective view of a color analysis panel of the system.

Referring to FIG. 2, a color analysis control panel 24 has the density and color controls 11 and 12 mounted thereon. While joysticks controlling potentiometers could be employed, the density control 11 is preferably a device known as a trackwheel, and the color control 12 is preferably a trackball unit. The controls 11 and 12 are similarly constructed, the density control 11 being a single axis control while the color control 12 is a dual axis control. The trackwheel 11 operates by interruptions of a beam of light as the wheel is rotated. Such interruptions may be counted by the computer system 10 in order to detect operation of the control. The interruptions are sometimes referred to as "clicks". The trackball 12 operates on similar principles except that it can be rotated about two orthogonal axes. The trackwheel 11 and trackball 12 are conventional devices as may be obtained from Atari, Incorporated (Warner Communications).

The trackball 12 is referred to as a vector length color control wherein the direction of the vector indicates hue and the length of the vector indicates saturation of that hue. The trackball 12 is associated with a so-called color wheel 27 which surrounds the trackball on the panel 24. On the color wheel 27, the additive and subtractive primary colors are expressed as specific directions from an axis of the color wheel 27. The additive primary colors include red, green and blue while the subtractive primary colors include magenta, yellow, and cyan. The trackball 12 is interfaced through the computer system 10 to the lamphouse 5 such that rotation of the trackball 12 toward a particular color increases the intensity of that color in the balance of the light produced by the lamphouse 5. For example, rotation toward the color blue increases the intensity of the blue source within the lamphouse 5. This may be accomplished either by actually increasing the voltage on a blue bulb (not shown) to increase the blue intensity or by decreasing the intensities of the green and red bulbs. The situation is similar for altering the intensities of the subtractive primary colors. A characteristic of the trackwheel 11 and trackball 12 is that there are no limits to rotation of these controls. That is, the controls may be rotated more than a full circle about their axes. This feature removes the necessity of centering the controls each time a new transparency is analyzed. The computer system 10 counts units of angular rotation, that is, clicks, from the starting position of the control.

As illustrated, the additive and subtractive primary colors are positioned at 60 degree spacings about the trackball 12. As stated previously, the trackball 12 is a two axis device wherein the trackball in actuality can only be rotated toward and away from the operator (up and down) and from side to side (left and right). However, the effect of moving the trackball toward any direction on the color wheel 27 can be accomplished by combining the rotations about the two axes, that is, by vector addition. This facility, as well as the click counting operations are accomplished by routines within the [softwear] *software* of the computer system 10.

The color analysis control panel 24 is provided with the principal controls for use in analyzing transparencies including a scan key 28, an accept key 29, and an option key 30. Dual sets of the keys 28, 29, and 30 are provided for left or right handed operators. Activation of one of the sets of the keys is selected by operation of one of the keys on the keyboard 18. In general, operation of scan key 28 indicates to the computer system 10 that a transparency is to be analyzed; operation of the accept key 29 informs the computer system 10 that the controls 11 and 12 have been adjusted such that an acceptably balanced image appears on the monitor 8; and operation of the option key 30 causes the image of the transparency 4 which is being illuminated by the lamphouse, that is, the "live" image, to be stored in the image memory 14. The panel 24 further includes a focus control 31 and a zoom control 32. The focus and zoom controls 31 and 32 are each a three-way on/off/on control and are used to control respectively a focus motor 35 and a zoom motor 36 (FIG. 4) which move elements of the image sensor optical system 37 to properly focus the image of the transparency 4 on the image sensor 6 and to cause a reproduction of the image to assume a desired size on the video monitor 8.

The image sensor 6, optics 37, focus motor 35, and zoom motor 36 may simply comprise a conventional color video camera, preferably of high quality. Alternatively, these components may be separate components assembled within the console 2. In particular, the image sensor 6 is preferably a solid state image sensor which is commercially available as a separate component from the optics and motors. The particular image sensor which is employed would be determined by its individual characteristics in comparison with the characteristics of further components of the system 1.

In using the system 1 to analyze a photographic transparency 4, a reference transparency is placed on the object plane 3 below the lamphouse 5. The reference image 4 is a well balanced negative or positive transparency which is a reproduction of a subject similar to the subject of the transparencies which will be analyzed. For example, if the production transparencies are portraits, the reference transparency would be a properly color balanced portrait, sometimes referred to as a "Shirley". If the production transparencies were images of outdoor scenes, the reference image would also be of an outdoor scene, preferably including similar subject matter such as sky, vegetation, water or the like. The scan key 28 is operated to place the system in a mode for analyzing the reference image. The reference image is recorded by the image sensor, digitized by the image control unit 7, and displayed on the video monitor 8. The density control 11 and color control 12 are manipulated in order to set up the lamphouse 5 for the reference image. Presumably, a substantially white light, that is equal parts of red, green and blue, would be set using the reference image. Alternatively, data for a start-up lamp-house balance could be stored within the computer system 10. Operation of the accept key 29 in conjunction with a particular key on the keyboard 18 would signal to the computer system 10 that the current image is a reference image. Operation of the option key 30 would then cause the reference image to be stored digitally in the image memory 14.

The reference transparency is then removed and a production transparency of the same type (that is, negative or positive) is placed on the object plane 3 below the lamphouse 5. Operation of the scan key 28 causes the image as sensed by the image sensor 6 to be digitized and processed in such a manner that the live image of the production transparency 4 along with the reference image stored in the memory 14 are reconverted to analog signals and displayed side-by-side in a split screen mode on the video monitor 8. For example, the production image can be displayed on the left half 39 of the screen of the monitor 8 and the reference image is displayed on the right half 40 of the screen. Alternatively, the live production image can be displayed on the entirety of the screen of the monitor 8 and the reference image may be displayed on a second video monitor 41 (FIG. 4) for comparison.

The operator manipulates the density control 11 and color control 12 to achieve a color balance which visually matches the color balance of the reference image. When such a balance has been achieved, the operator presses the accept key 29 to cause the computer system to calculate the color correction values for the primary colors employed which represent the differences between the intensities of the primary components at which the lamphouse bulbs were adjusted for the reference image and the intensities which have been adjusted to achieve a satisfactory color balance for the production image. The color correction values may then be printed as numbers on a paper tape by the paper tape printer 16, stored as binary information on a magnetic tape by the magnetic tape drive 15, or stored on a magnetic card by a magnetic card read/write device (not shown). Alternatively, the computer system 10 may be controlled to cause the color correction values to be printed as a bar code by a bar code printer 43.

Regardless of the medium of expression of the color correction values, such values are employed to balance the color of the light which is used to expose the photographic paper for producing a photographic print from the production transparency 4. If the photographic printer (not shown) requires the manual setting of color correction values, the numbers printed by the paper tape printer 16 would be appropriate. However, it is conceivable that such a photographic printing machine could be adjusted automatically from information read from a magnetic tape or bar code. Additionally, the photographic printing machine might be controlled from a central computer 45, in which case the color correction values would be transmitted as binary information from the computer system 10 to such a central computer 45. In addition, such a central computer might be employed to process order information and billing information for a photographic printing job order to which the current production transparency 4 relates.

After the accept key 29 is operated for the current production transparency, the transparency 4 may be removed from the object plane 3 and the next transparency placed on the object plane for analysis. There is no necessity for centering or resetting the density and color controls 11 and 12 since the color correction values will be referenced to the color balance settings of the lamphouse 5 which were adjusted for the reference transparency. The operator simply operates the scan key 28 and dials the density and color controls 11 and 12 until the color balance of the production image as viewed on the monitor 8 matches the color balance of the reference image thereon.

Figure 4:
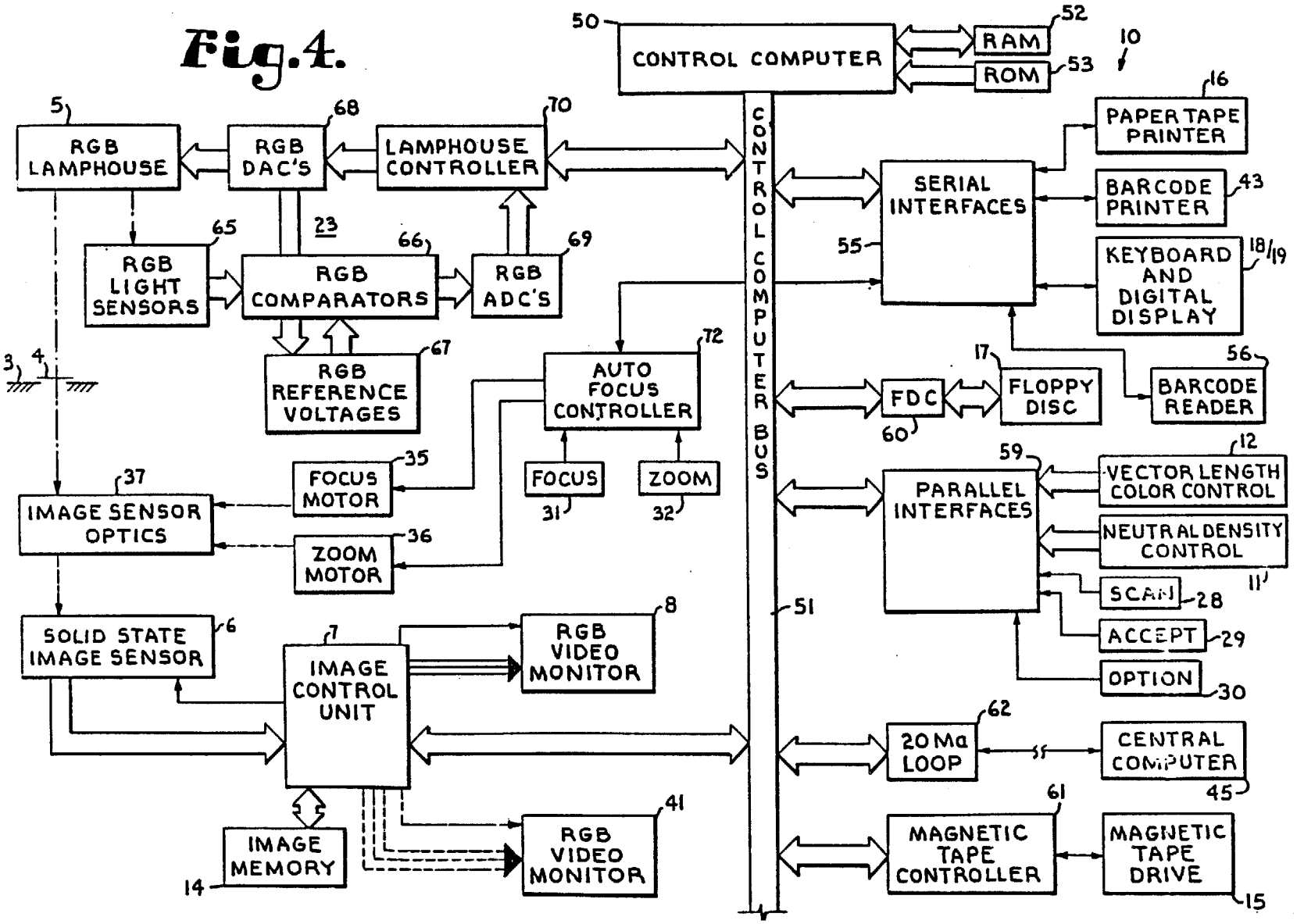
FIG. 4 is an overall block diagram of the system.

Referring to FIG. 4, the computer system 10 includes a control computer 50 which includes a control computer bus 51. The computer bus 51 include address lines, data lines, and control lines for communication between the computer 50 and peripheral devices connected thereto. The computer 50 includes read/write memory or RAM 52 for temporary storage of information and a read only memory or ROM 53 in which is stored the operating software for the computer 50 for controlling the imaging system 1. The computer 50 may be any type of general purpose digital computer which is powerful enough and operates at a sufficient speed to control the system 1. A particularly suitable central processing unit for the computer 50 is an LSI-11/23 system manufactured by the Digital Equipment Corporation.

The paper tape printer 16, bar code printer 43, and the keyboard/digital display unit 18/19 are interfaced to the computer 50 through a serial interface unit 55 which is connected to the computer bus 51. The serial interface unit 55 provides a plurality of standardized serial interface ports, such as RS-232 serial ports. The computer system 10 may include a bar code reader or light pen 56 for entry of such information as job order numbers and the like into the computer system 10. Other peripheral equipment may be connected to the serial interface unit 55 as will be detailed below.

The density control 11, color control 12, scan key 28, accept key 29, and option key 30 are all connected through a parallel interface unit 59 which is connected to the computer bus 51. The trackwheel used for the density control 11 requires two bits to determine increasing or decreasing density direction plus a density interrupt connection. In a similar manner, the trackball 12 requires two bits for left or right X direction determination plus an X interrupt and two bits for an up and down Y direction determination plus a Y interrupt connection. The serial interface unit 55 and [paralleled] *parallel* interface unit 59 are substantially conventional interface units and are, therefore, not detailed herein.

The floppy disc drive 17 is connected to the computer 50 through a floppy disc controller 60 of conventional design. A disc on the drive 17 may be used to store a reference image or a plurality of reference images. In addition, software related to the operation of the computer 50, the settings of the color intensities of the lamphouse 5, the focus and zoom settings of the image sensor optics 37, and information related to the image control unit 7 can be stored on the floppy disc 17. In addition, the floppy disc drive 17 may be supplemented by a hard disc drive (not shown). The magnetic tape drive 15 is interfaced to the computer 50 through a magnetic tape controller 61 of conventional design. A central computer 45 may be interfaced to the control computer 50 by any suitable means such as a 20 milliamp loop or Teletype (registered trademark) interface 62.

In the lamphouse control system 23, each of the light sources is individually controlled; however, for simplicity of illustration and description, the functions are grouped. The light emanating from the lamphouse 5 is sensed by individual red, green and blue (RGB) photoelectric sensors 65. The outputs from the sensors 65 are connected to RGB comparators respectively with RGB reference voltages 67 which are supplied by RGB digital to analog converters 68. The outputs of the comparators 66 are supplied to RGB analog to digital converters 69, the digital outputs of which are connected to a lamphouse controller 70. The lamphouse controller 70 may be a dedicated digital control computer and is interfaced to the computer bus 51. Settings for the lamphouse light sources may be received from the computer 50 and are affected by the operation of the density control 11 and color control 12. The lamphouse controller 70 controls the supply voltages to the lamphouse light sources through the digital-to-analog converters 68. The converters 68 include scaling amplifiers (not shown) for deriving the reference voltages 67 and the supply voltages for the lamp house light sources. The lamphouse control system 23, in addition to initially setting the lamphouse color balance and adjusting same as the controls 11 and 12 are manipulated, is able to maintain the set color balance as the light sources age. The lamphouse control system 23 are described above is one type of conventional closed loop lamphouse control system and other types of lamphouse control systems may be employed in the system 1.

The system 1 allows selective manual focusing and zooming by the operator by use of the focus and zoom controls 31 and 32. Preferably, the system 1 further includes an automatic focusing controller 72. Once the image from the transparency 4 has been focused on the image sensor 6 by operation of the focus control 31, the auto focus controller 72 is operative to maintain a focused image as the zoom control 32 is operated to vary the size of the image as viewed on the video monitor 8. The controller 72 includes software algorithms which selectively control the focus motor 35 and zoom motor 36 to maintain a set focus as the image sensor optics 37 are moved to change the size of the displayed image.

Figure 5:
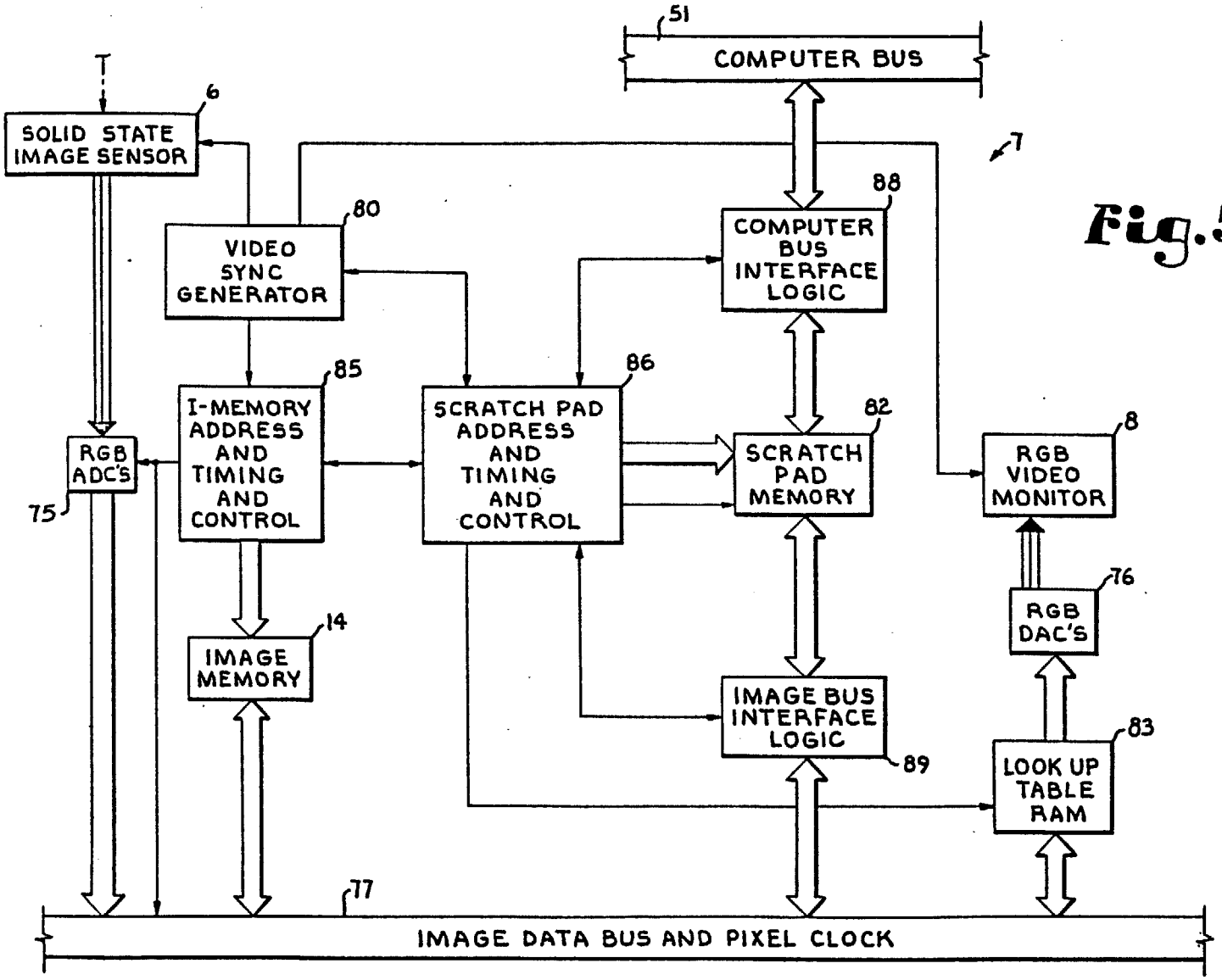
FIG. 5 is a block diagram of an image control unit of the system according to the present invention.

Referring to FIG. 5, the image control unit 7 is the video processing component of the system 1. The image control unit 7 includes red, green and blue analog to digital converters 75 which convert the respective analog video signals from the image sensor 6 to digital representations thereof. Likewise, red, green, and blue digital to analog converters 76 convert the digital representations of the image sensed by the sensor 6 or which are stored in the image memory 14 to analog red, green, and blue video signals for driving the video monitor 8. Communication of digital representations of the video signals between components within the image control unit 7 is provided by an image data bus 77. Further, the image control unit 7 provides communication between the image bus 77 and the computer bus 51.

The master timing component of the image control unit 7 is a video synchronization or sync generator 80. The video sync generator 80 provides horizontal and vertical timing signals to the image sensor 6 and to the video monitor 8. Further, the generator 80 provides timing signals for the manipulation of information to and from the memories within the image control unit 7 including the image memory 14, a scratch pad memory 82, and a look-up table memory 83. As stated previously, the image memory 14 is used to store a digital representation of a reference image. The scratch *pad* memory 82 is employed for implementing the exchange of digital information between the computer bus 51 and the image bus 77. The look-up table memory 83 is a read/write memory and is employed in a calibration or selective scaling function.

The images displayed on the video monitor 8 are generated as vertically spaced horizontal lines of picture elements or pixels. The color of each pixel is determined by the binary value of three bytes of digital information associated respectively with the red, green, and blue components of the pixel. Each byte has seven significant bits whereby 128 levels of intensity for each color can be expressed. Each byte has an eight bit which in the system 1 is insignificant. The analog voltage of each primary color signal for the video monitor 8 is decoded by the digital to analog converters 76 from bytes received from the look-up table memory 83 and indirectly therethrough from either the image memory 14 for reference images or the analog to digital converters 75 for live images sensed by the image sensor 6.

The image memory 14 is controlled by an image memory address, timing, and control unit or image memory controller 85. Likewise, the scratch pad memory 82 is controlled by a scratch pad address, timing and control unit or scratch pad controller 86. The scratch pad controller 86 also controls the operation of the look-up table memory 84. The image memory controller 85 functions to generate addresses within the image memory 14 and provides the necessary read and write enable signals for operation of the image memory 14. The illustrated image memory is implemented by dynamic RAM chips such that the multiplexing of addresses is required for accessing memory locations therein. The controller 85 provides such multiplexing signals. In order to maintain the reference image on the video monitor 8, the bytes providing the pixel information must be outputted from the image memory 14 at a video rate and in proper synchronism. The image memory controller 85 provides timing signals for such video scanning of the image memory in cooperation with the video sync generator 80.

In the illustrated embodiment of the system 1, the video monitor 8 is operated in a split screen mode with the live image on one half of the screen and the reference image on the other half. The video monitor is operated with a nominal pixel resolution of 512 vertically spaced lines of 512 horizontally positioned pixels. The image memory 14 is sized to store a single half frame image for display upon the monitor 8. Therefore, the image memory has a capacity of 128K bytes for each of the red, green, and blue primary colors.

The scratch pad memory 82 is a high speed read/-write memory which is employed principally to interface between the computer bus 51 and the image bus 77. The use of a separate image bus within the image control unit 7 relieves computer bus 51 of the necessity of carrying image data which is used solely within the image control unit 7. The image bus 77, therefore, is optimized for carrying the pixel information. The configuration of the image bus 77 is not directly compatible with the configuration of the computer bus 51 which is optimized for use by the control computer 50. The manner in which the scratch pad memory 82 is operated faciliates the transfer of data between the two buses. A computer bus interface logic unit 88 interfaces the scratch pad memory 82 to the computer bus 51, and an image bus interface logic unit 89 interfaces the scratch pad memory 82 to the image bus 77. The interface units 88 and 89 include controlled bus transceivers (not shown). Further, the computer bus interface unit 88 includes address decoders. The interface units 88 and 89 are operated under the control of scratch pad controller 86 in cooperation with the video sync generator 80 and the image memory controller 85. In the illustrated image control unit 7, the scratch pad memory 82 functions as a conventional RAM with respect to the computer bus 51. However, with respect to the image bus 77, the memory 82 functions as a so-called silo or sequential memory in the manner of a magnetic tape. The particular mode in which the scratch pad memory 82 functions is controlled by the scratch pad controller 86.

The look-up table memory 83 functions to calibrate the system 1 such that the images displayed on the video monitor 8, the adjustments made to the density and color controls 11 and 12, and the color correction numbers calculated by the control computer 50 are meaningfully interrelated. The information within the look-up table memory 83 compensates for non-linearities inherent in the components of the system 1, particularly the analog components such as the lamphouse 5, the image sensor 6, the analog to digital converters 75, the digital to analog converters 76, and the video monitor 8. The system 1 is provided with self diagnostic software routines which may be stored [on] *in* the read only memory 53 or on a disc in the disc drive 17 which may be periodically run in order to check the response of such analog components. For example, the lamphouse 5 might be adjusted by the computer 50 to a particular color balance, and the response thereto by the image sensor 6 as converted by the analog to digital converter 75 could be analyzed to determine the response of those elements. If necessary, the look-up table information can be altered in order to compensate for detected changes in response. In ordinary operation, the look-up table memory 83 functions by employing the pixel bytes as addresses which cause the output of data bytes from the memory 83 to the digital to analog converters 76 under the control of the scratch pad controller 86. However, when the look-up table bytes are altered by the computer 50, the memory 83 functions as a substantially conventional RAM under the control of the scratch pad controller 86.

In the illustrated embodiment of the image [controlled] *control* unit 7, the analog to digital converters 75 are so-called "flash" analog to digital converters for operation at a video rate. The converters 75 output a 7 bit byte for each of the primary colors. The video sync generator 80, image memory controller 85, and scratch pad controller 86 are, preferably, implemented as programmable logic arrays along with more common types of integrated circuit logic elements. The scratch pad controller 86 includes control registers (not shown) for storing commands from the control computer 50 to control the operation of the image control unit 7. The split screen mode employed for displaying a live image of a photographic transparency along with a reference image on the video monitor 8 is controlled by cooperation of the video sync generator 8, the image memory controller 85, and elements within the scratch controller 86.

While the system 1 has been described in terms of analyzing transparent photographic targets 4, the system 1 also has utility in color analyzing opaque targets, such as photographic prints. Another foreseen use of the system is in the analysis of pre-exposed control strips which have standard color patches thereon. Such strips are employed by photographic laboratories for testing their color processes.

For analyzing such opaque targets, the system 1 would be provided with means (not shown) for reflecting light from the lamphouse 5 and for reflecting the illuminated image onto the image sensor 6. Such means would involve mirrors (not shown) and possibly some optical elements (not shown) depending on the size of the opaque target. A reference image would be stored of a standard print of subject matter similar to that of the target 4. In addition, look-up tables for opaque targets would be selectively stored in the look-up table memory 83. In all other respects, the analysis of opaque targets using the system 1 would be substantially similar to the analysis of transparent targets.

The computerized video imaging system 1 as described is highly accurate and convenient to use by an operator in the color analysis of photographic transparencies. Because of the accuracy of operation, the instances of reanalyzing transparancies is minimized such that production rate is increased. Further, because of the employment of digital circuitry whereever possible, the use of software calibration and diagnostics, and the virtual absence of variable resistors required to be adjusted for calibration, the maintenance of the quality of production is greatly simplified.

It is to be understood that while certain forms of the present invention have been illustrated and described herein, it is not to be limited to the specific forms or arrangement of parts described and shown.

What is claimed and desired to be secured by Letters Patent is as follows:

1. A computerized video imaging system comprising:

(a) target mounting means for supporting a color photographic production target;

(b) lamphouse means positioned to illuminate said target and including light sources respectively of a set of primary colors, the intensities of light from said light sources being controllable individually and collectively in measurable amounts;

(c) an image sensor positioned to receive light from said lamphouse means as altered by interaction with said target and generating over a time cycle a set of color component production video signals which in combination represent the hue and intensity of light as altered by interaction with spatial regions of said target;

(d) image storage means storing color reference representations of a substantial area of a reference target, said reference representations being related to a reference balance of intensities of said light sources;

(e) color video monitor means operatively connected to said image sensor means and said image storage means, receiving signals related to said reference representations and said production video signals, reproducing at least a portion of a production image representative of said production target as illuminated by said lamphouse means and at least a portion of a reference image representative of said reference [transparency] *target* as illuminated by said lamphouse means, with said light sources set to said reference balance;

(f) light source adjustment means for adjusting the intensities of light from said light sources, said adjustment means being adjusted until the color balance of said production image assumes a production balance wherein the color balance of said production image as viewed on said monitor means appears to match the color balance of said reference image as viewed on said monitor means; and (g) computer means interfaced to said adjustment means and said image storage means and operative to calculate photographic color correction values for said production target which are representations respectively of the differences between the intensities of light from said light sources for said production balance and the intensities of light from said light sources for said reference balance.

2. A computerized video imaging system comprising;

(a) target mounting means for supporting a target photographic transparency;

(b) lamphouse means positioned to pass light through said transparency and including light sources respectively of a set of primary colors, the intensities of light from said light sources being controllable individually and collectively in measurable amounts;

(c) an image sensor positioned to receive light passing from said lamphouse means through said transparency and generating over a time cycle a set of color component target video signals which in combination represent the hue and intensity of light received through spatial regions of said transparency;

(d) image storage means storing color reference representations of a substantial area of a reference transparency, said reference representations being related to a reference balance of intensities of said light sources;

(e) color video monitor means operatively connected to said image sensor means and said image storage means, receiving signals related to said reference representations and said target video signals, reproducing at least a portion of a target image representative of said target transparency as illuminated by said lamphouse means and at least a portion of a reference image representative of said reference transparency as illuminated by said lamphouse means with said light sources set to said reference balance;

(f) light source adjustment means for adjusting the intensities of light from said light sources, said adjustment means being adjusted until the color balance of said target image assumes a target balance wherein the color balance of said target image as viewed on said monitor means appears to match the color balance of said reference image as viewed on said monitor means; and (g) computer means interfaced to said adjustment means and said image storage means and operative to calculate photographic color correction values for said target transparency which are representations respectively of the differences between the intensities of light from said light sources for said target balance and the intensities of light from said light sources for said reference balance.

3. A system as set forth in claim 2 wherein:

(a) said monitor means is a [one] *single,* color video monitor; and (b) said system includes image timing means operative to cause the display of said portion of said target image and said portion of said reference image in substantially side-by-side relation on said video monitor.

4. A system as set forth in claim 2 wherein said light source adjustment means includes:

(a) a neutral density control operable to control said light sources in unison; and (b) a color balance control operable to adjust the balance of intensities of light from said light sources.

5. A system as set forth in claim [2] *4* wherein:

(a) said color balance control includes a trackball device.

6. A system as set forth in claim 2 wherein:

(a) said lamphouse means is an additive color lamphouse; and (b) said light sources include controllable sources of red, green, and blue light.

7. A system as set forth in claim 2 wherein:

(a) said image sensor is a solid state image sensor.

8. A computerized video imaging system comprising:

(a) target mounting means for supporting a target photographic transparency;

(b) lamphouse means positioned to pass light through said transparency and including light sources respectively of a set of primary colors, the intensities of light from said light sources being controllable individually and collectively in measurable amounts;

(c) an image sensor positioned to receive light passing from said lamphouse means through said transparency and generating over a time cycle a set of color component video signals which in combination represent the hue and intensity of light received through spatial regions of said transparency;

(d) a set of analog to digital converters (ADC's) connected to said image sensor and operative over said time cycle to convert said video signals to target digital representations of color [components] *component* intensities of said spatial regions of said transparency;

(e) an image memory for the storage of reference digital representations of color component intensities of a substantial area of a reference transparency, said reference digital representations being related to a reference balance of intensities of light from said light sources;

(f) digital to analog converter (DAC) means operatively connected to said ADC's and said image memory and converting over said time cycle said target digital representations and said reference digital representations to respective display color component video signals;

(g) color video monitor means connected to said DAC means, receiving said display color component video signals, and reproducing at least a portion of a target image representative of said target transparency as illuminated by said lamphouse means and at least a portion of a reference image representative of said reference transparency as illuminated by said lamphouse means with said light sources set to said reference balance;

(h) image timing means operatively connected to said image sensor, said ADC's, said image memory, and said monitor means and controlling said time cycle thereof;

(i) light source adjustment means for adjusting the intensities of light from said light sources, said adjustment means being adjusted until the color balance of said target image assumes a target balance wherein the color balance of said target image as viewed on said monitor means appears to match the color balance of said reference image as viewed on said monitor means; and (j) computer means interfaced to said adjustment means, said ADC's, and said image memory and operative to calculate photographic color correction values for said target transparency which are representations respectively of the differences between the intensities of light from said light sources for said target balance and the intensities of light from said light sources for said reference balance.

9. A system as set forth in claim 8 wherein:

(a) said monitor means is [one] *a single,* color video monitor; and (b) said image timing means is operative to cause the display of said portion of said target image and said portion of said reference image in substantially side-by-side relation on said video monitor.

10. A system as set forth in claim 8 wherein said light source adjustment means includes:

(a) a neutral density control operable to control said light sources in unison; and (b) a color balance control operable to adjust the balance of intensities of light from said light sources.

11. A system as set forth in claim 10 wherein:

(a) said color balance control includes a color balance control operator movable in two dimensions; and (b) said color balance control is arranged as a vector length color control wherein the direction of movement of said operator corresponds to the dominant hue of the color balance of light from said light sources which is affected by said movement and the vector resultant length of said movement corresponds to the degree of change of said dominant hue.

12. A system as set forth in claim 10 wherein:

(a) said color balance control includes a trackball device.

13. A system as set forth in claim 10 wherein:

(a) said neutral density control includes a trackwheel device.

14. A system as set forth in claim 8 wherein:

(a) said lamphouse means is an additive color lamphouse; and (b) said light sources include controllable sources of red, green and blue light.

15. A system as set forth in claim 8 wherein:

(a) said image sensor is a solid state image sensor.

16. A system as set forth in claim 8 including:

(a) look-up table memory means connected to [the] *a* digital side of said DAC means, said look-up table memory means modifying the binary values of said target digital representations and said reference digital representations prior to conversion by said DAC means.

17. A system as set forth in claim 16 wherein:

(a) said look-up table memory means is a look-up table read/write memory; and (b) said look-up table memory is interfaced to said computer means whereby look-up table values stored in said look-up table memory can be selectively communicated thereto by said computer means.

18. A system as set forth in claim 16 wherein:

(a) said target transparency is a photographic negative;

(b) said reference transparency is a photographic negative; and (c) said look-up table means has stored therein look-up table values for modifying the binary values of said target digital representations and said reference digital representations such that said DAC means causes said monitor means to display photographically positive images of said negatives.

19. A method of color analyzing photographic transparencies comprising the steps of:

(a) illuminating an image sensor through a reference color photographic transparency by light from a lamphouse including controllable light sources respectively of a set of primary colors;

(b) generating over a time cycle a set of color component reference video signals by means of said image sensor, said reference video signals in combination representing the hue and intensity of light received through spatial regions of said reference transparency as illuminated by said lamphouse with said light sources set to a reference balance of light intensities;

(c) storing in an image storage means reference image representations of said reference video signals which may be reconstructed to reproduce a reference image of said reference transparency as illuminated by said lamphouse set to said reference balance;

(d) illuminating said image sensor through a target color photographic transparency by light from said lamphouse;

(e) generating over said time cycle a set of color component target video signals by means of said image sensor, said target video signals in combination representing the hue and intensity of light received [thorugh] *through* spatial regions of said target transparency as illuminated by said lamphouse;

(f) displaying on color video monitor means a reference image from the reference image representations stored in said image storage means;

(g) displaying on said color video monitor means a target image from target representations of said target video signals;

(h) visually comparing the displayed target color balance of said target image with the displayed reference color balance of said reference image;

(i) adjusting the color balance of the intensities of light from said light sources of said lamphouse using color adjustment means until a target balance of the light intensities from said light sources causes said target color balance to appear to match said reference color balance as viewed on said color video monitor means; and (j) calculating a set of color correction values which are representations respectively of the differences between the intensities of light from said light sources for said target balance and the intensities of light from said light sources for said reference balance.

20. A method as set forth in claim 19 including the step of:

(a) printing said color correction values as numbers on paper by means of a printer.

21. A method as set forth in claim 19 including the step of:

(a) storing binary representations of said color correction values on a magnetic medium.

22. A method as set forth in claim 19 including the step of:

(a) printing said color correction values as a bar code on paper by means of a bar code printer.

23. A method as set forth in claim 19 wherein each of said illuminating steps includes the step of:

(a) illuminating said image sensor through a respective transparency by light from an additive lamphouse including controllable sources of red, green, and blue light.

24. A method as set forth in claim 19 wherein said generating steps each includes the step of:

(a) generating the respective sets of video signals using a solid state image sensor.

25. A method as set forth in claim 19 including the steps of:

(a) converting over said time cycle said set of color component reference video signals to a respective set of reference digital representations.

(b) storing said reference digital representations in said image storage means, said image storage means being a read/write image memory;

(c) converting over said time cycle said set of color component target video signals to a respective set of target digital representations; and (d) converting said set of reference digital representations and said set of target digital representations respectively to a set of reference display video signals and a set of target display video signals for displaying said reference image and said target image on said color video monitor means.

26. A method as set forth in claim 25 including the step of:

(a) modifying said reference digital representations and said target digital representations according to look-up table values stored in a look-up table memory prior to the conversion of said digital representations respectively to said display video signals.

27. A method as set forth in claim 26 wherein said modifying step includes the step of:

(a) storing selected sets of said look-up table values in said look-up table memory, said look-up table memory being a read/write look-up table memory.

28. A method of color analyzing photographic images comprising the steps of:

(a) illuminating an image sensor by light from a lamphouse which has been altered by interaction with a reference color photographic target, said lamphouse including controllable light sources respectively of a set of primary colors;

(b) generating over a time cycle a set of color component reference video signals by means of said image sensor, said reference video signals in combination representing the hue and intensity of light altered by spatial regions of said reference target as illuminated by said lamphouse with said light sources set to a reference balance of light intensities;

(c) storing in an image storage means reference image representations of said reference video signals which may be reconstructed to reproduce a reference image of said reference target as illuminated by said lamphouse set to said reference balance;

(d) illuminating said image sensor by light from said lamphouse which has been altered by interaction with a production color photographic target;

(e) generating over said time cycle a set of color component production video signals by means of said image sensor, said production video signals in combination representing the hue and intensity of light altered by spatial regions of said production target as illuminated by said lamphouse;

(f) displaying on color video monitor means a reference image from the reference image representations stored in said image storage means;

(g) displaying on said color video monitor means a production image from production representations of said production video signals;

(h) visually comparing the displayed production color balance of said production image with the displayed reference color balance of said reference image;

(i) adjusting the color balance of the intensities of light from said light sources of said lamphouse using color adjustment means until a production balance of the light intensities from said light sources causes said production color balance to appear to match said reference color balance [is] *as* viewed on said color video monitor means; and (j) calculating a set of color correction values which are representations respectively of the differences between the intensities of light from said light sources for said production balance and the [intesities of light from sid] *intensities of light from said* light sources for said reference balance.

*29. A computerized video imaging system comprising:*

*(a) target mounting means for supporting a color photographic target;*

*(b) light source means positioned to illuminate said target;*

*(c) an image sensor positioned to receive light from said light source means as altered by interaction with said target and generating over a time cycle a set of color component video signals which in combination represent the hue and intensity of light from said light source means as altered by interactions with spatial regions of said target;*

*(d) image storage means storing color representations of an image;*

*(e) a color video display device, having a video screen, operatively connected to said image sensor means and said image storage means, and operative to display images derived from video signals received from said image sensor means and said image storage means; and*

*(f) control means having said image sensor means, said image storage means, and said video display device connected thereto; said control means being operative to recall a first image from said image storage means and cause the display of at least a portion of said first image on said screen of said video display device and to cause at least a portion of a second image sensed by said image sensor means to be displayed on said screen of said video display device substantially simultaneously with the display of said first image.*

*30. A system as set forth in claim 29 including:*

*(a) color balance adjustment means for adjusting a second color balance of said second image in comparison to a first color balance of said first image, as displayed on said video display device.*

*31. A system as set forth in claim 30 wherein:*

*(a) said control means has said color balance adjustment means and said image storage means connected thereto and is operative to calculate photographic color correction values for said second image which are representations respectively of the difference between said second color balance before adjustment of said adjustment means and said second color balance after adjustment of said adjustment means.*

*32. A computerized video imaging system comprising:*

*(a) target mounting means for supporting a color photographic target;*

*(b) light source means positioned to illuminate said target;*

*(c) an image sensor positioned to receive light from said light source means as altered by interaction with said target and generating over a time cycle a set of color component video signals which in combination represent the hue and intensity of light from said light source means as altered by interactions with spatial regions of said target;*

*(d) image storage means storing color representations of an image;*

*(e) a first color video display device operatively connected to said image storage means to display a first image stored in said image storage means;*

*(f) a second color video display device operatively connected to said image sensor means to display a second image derived from a video signal received from said image sensor means; and*

*(g) control means having said image sensor means, said image storage means, and said first and second video display devices connected thereto; said control means being operative to recall a first image from said image storage means and cause the display of at least a portion of said first image on said first video display device and to cause at least a portion of a second image sensed by said image sensor means to be displayed on said second video display device substantially simultaneously with the display of said first image on said first video display device.*

*33. A system as set forth in claim 32 including:*

*(a) color balance adjustment means for adjusting a second color balance of said second image in comparison to a first color balance of said first image, as displayed on said first video display device.*

*34. A system as set forth in claim 33 wherein:*

*(a) said control means has said color balance adjustment means and said image storage means connected thereto and is operative to calculate photographic color correction values for said second image which are representations respectively of the difference between said second color balance before adjustment of said adjustment means and said second color balance after adjustment of said adjustment means.*

*35. A method of comparing color images comprising the steps of:*

(a) converting a first color image having a first color balance to a first color video signal;

(b) storing said first video signal in video signal storage means;

(c) recalling said first video signal and applying said first video signal to color video display means in such a manner as to display said first color image on a first portion of said video display means;

(d) converting a second color image having a second color balance to a second color video signal;

(e) applying said second video signal to said video display means in such a manner as to display said second color image on a second portion of said video display means simultaneously with the display of said first image;

(f) comparing said second color balance with said first color balance; and (g) changing the relative color balance of said color images.

36. A method as set forth in claim 35 including the steps of:

(a) converting said first image to said first video signal by video conversion means; and (b) converting said second image to said second video signal by the same video conversion means.

37. A method as set forth in claim 35 wherein said video display means is a video display including a single video screen, and including the steps of:

a) displaying said first image on a first portion of said video screen; and (b) displaying said second image on a second portion of said video screen.

38. A method as set forth in claim 35 wherein said video display device includes a first video display device and a second video display device, and including the steps of:

(a) displaying said first image on said first video display device; and (b) displaying said second image on said second video display device.

39. A method as set forth in claim 35 including the steps of:

(a) providing video conversion means to convert said first and second images respectively to said first and second video signals;

(b) providing color balance adjustment means operatively connected between said video conversion means and said video display device; and (c) adjusting said color balance adjustment means such that said second color balance changes in relation to said first color balance as viewed on said video display device.

40. A method as set forth in claim 39 including the step of:

(a) adjusting said color balance adjustment means until said second color balance appears to match said first color balance as viewed on said video display device.

41. A method as set forth in claim 39 including the step of:

(a) measuring the difference between said second color balance before said adjusting step and said second color balance after said adjusting step.

42. A method of color analyzing photographic images comprising the steps of:

(a) converting a first color image having a first color balance to a first color video signal;

(b) storing said first video signal in video signal storage means;

(c) recalling said first video signal and applying said first video signal to color video display means in such a manner as to display said first color image on a first portion of said video display means;

(d) converting a second color image having a second color balance to a second color video signal;

(e) applying said second video signal to said video display means in such a manner as to display said second color image on a second portion of said video display means simultaneously with the display of said first image; and (f) analyzing said second color balance of said second image in relation to said first color balance of said first image.

43. A method of color analyzing photographic images comprising the steps of:

(a) illuminating image sensor means by light from light source means which has been altered by interaction with a first color photographic target;

(b) generating over a time cycle a first set of color component video signals by means of said image sensor means, said first video signals in combination representing the hue and intensity of light altered by spatial regions of said first target as illuminated by said light from said light source means;

(c) storing in an image storage means first image representations of said first video signals which may be reconstructed to reproduce a first image of said first target as illuminated by light from said light source means;

(d) illuminating said image sensor means by light from said light source means which has been altered by interaction with a second color photographic target;

(e) generating over said time cycle a second set of color component video signals by means of said image sensor means, said second video signals in combination representing the hue and intensity of light altered by spatial regions of said second target as illuminated by said light source means;

(f) displaying on a single screen of a color video display device said first image from the first image representations stored in said image storage means;

(g) displaying on said color video display device said second image by applying said second video signals to said color video display device; and (h) visually comparing a displayed second color balance of said second image with a displayed first color balance of said first image.

44. A method as set forth in claim 43 including the step of:

(a) adjusting said second color balance of said second image in relation to said first color balance of said first as viewed on said color video display device.

45. A method as set forth in claim 43 including the steps of:

(a) adjusting said second color balance of said second image until said second color balance appears to match said first color balance of said first image as viewed on said color video display device; and (b) calculating a set of color correction values which are representations of the difference between said second color balance before said adjusting step and said second color balance after said adjusting step.

46. A method of color analyzing photographic images comprising the steps of:

(a) illuminating image sensor means by light from light source means which has been altered by interaction with a first color photographic target;

(b) generating over a time cycle a first set of color component video signals by means of said image sensor means, said first video signals in combination representing the hue and intensity of light altered by spatial regions of said first target as illuminated by said light from said light source means;

(c) storing in an image storage means first image representations of said first video signals which may be reconstructed to reproduce a first image of said first target as illuminated by light from said light source means;

(d) illuminating said image sensor means by light from said light source means which has been altered by interaction with a second color photographic target;

(e) generating over said time cycle a second set of color component video signals by means of said image sensor means, said second video signals in combination representing the hue and intensity of light altered by spatial regions of said second target as illuminated by said light source means;

(f) displaying on a first color video display device said first image from the first image representations stored in said image storage means;

(g) displaying on a second color video display device said second image by applying said second video signals to said second color video display device; and (h) visually comparing a displayed second color balance of said second image with a displayed first color balance of said first image.

47. A method as set forth in claim 46 including the step of:

(a) adjusting said second color balance of said second image in relation to said first color balance of said first image as viewed respectively on said second and first color video display devices.

48. A method as set forth in claim 46 including the steps of:

(a) adjusting said second color balance of said second image until said second color balance appears to match said first color balance of said first image as viewed respectively on said second and first color video display devices; and (b) calculating a set of color correction values which are representations of the difference between said second color balance before said adjusting step and said second color balance after said adjusting step.

49. An apparatus for color analyzing photographic images comprising:

(a) color image sensor means operative to generate video signals representing color images sensed by said image sensor means;

(b) video storage means connected to said image sensor means and selectively operable to store video signals representing at least a first color image;

(c) a color video display device having said image sensor means and said video storage means interfaced thereto, said video display device displaying images represented by video signals applied to said video display device;

(d) control means having said image sensor means, said video storage means, and said video display device connected thereto; said control means causing the generation of a second video signal representing a second color image sensed by said image sensor means;

(e) said control means causing the recalling of a first video signal representing said first image from said video storage means and the application of said first and second video signals to said video display device in such a manner that said first image is displayed on a first portion of said video display device and simultaneously said second image is displayed on a second portion of said video display device;

(f) said first image having a first color balance and said second image having a second color balance as viewed on said video display device; and (g) said control means including color balance adjustment means operable to vary said second color balance.

50. An apparatus as set forth in claim 49 wherein:

(a) said video storage means is a digital storage means; and (b) said apparatus includes digitizer means connected to said image sensor means and selectively operable to digitize video signals prior to storage of same in said digital storage means.

51. An apparatus as set forth in claim 49 wherein said control means includes:

(a) color balance difference measuring means operable to measure the difference between said second color balance before operation of said color balance adjustment means and said second color balance after operation of said color balance adjustment means.

52. An apparatus for color analyzing photographic images comprising:

(a) image sensor means operative to generate video signals representing color images sensed by said image sensor means;

(b) video storage means connected to said image sensor means and selectively operable to store video signals representing at least a first color image;

(c) a first color video display device having said video storage means interfaced thereto and a second color video display device having said image sensor means interfaced thereto, said first and second video display devices displaying color images represented by video signals applied respectively to said video display devices;

(d) control means having said image sensor means, said video storage means, and said video display devices connected thereto; said control means causing the generation of a second video signal representing a second color image sensed by said image sensor means;

(e) said control means causing the recalling of a first video signal representing said first image from said video storage means and the simultaneous display of said first image on said first video display device and said second image on said second video display device;

(f) said first image having a first color balance and said second image having a second color balance as viewed respectively on said first and second video display devices; and (g) said control means including color balance adjustment means operable to vary said second color balance.

53. A method of color analyzing photographic images comprising the steps of:

(a) illuminating image sensor means by light provided by light source means and having a source color balance which is controllable, said light being altered by interaction with a photographic target;

(b) generating a video signal by said image sensor means which represents said light as altered by interaction with said target;

*(c) applying said video signal to a color video display device to display thereon an image of said target as illuminated by said light source means; and*

*(d) varying said source color balance to thereby vary an image color balance of said image as displayed on said video display device.*

*54. A method as set forth in claim 53 and including the steps of;*

*(a) prior to varying said source color balance, setting said light source means to a reference color balance thereof;*

*(b) varying said source color balance to achieve a desired image color balance as displayed on said display means; and*

*(c) calculating photographic color correction values for said target which represent a difference between said reference color balance and said source color balance means after varying same to achieve said desired image color balance.*

*55. An apparatus for color analyzing photographing images and comprising:*

*(a) light source means providing light having a source color balance which is controllable;*

*(b) color image sensor means positioned in spaced relation to said light source means to receive light therefrom as altered by interaction with a photographic target and generate a video signal representing hues and intensities of said light as altered by interaction with spatial regions of said target;*

*(c) a color video display device interfaced with said image sensor means, having said video signal applied thereto, and displaying an image of said target as illuminated by said light source means; said image, as displayed, having an image color balance related to said source color balance whereby variation of said source color balance causes a corresponding variation in said image color balance; and*

*(d) color balance sensor means receiving said light from said light source means and generating a source color balance signal numerically representing said source color balance.*

* * * * *